March 21, 1950 — A. C. NIELSEN — 2,501,079
RECORDING APPARATUS
Filed May 1, 1946 — 3 Sheets-Sheet 1
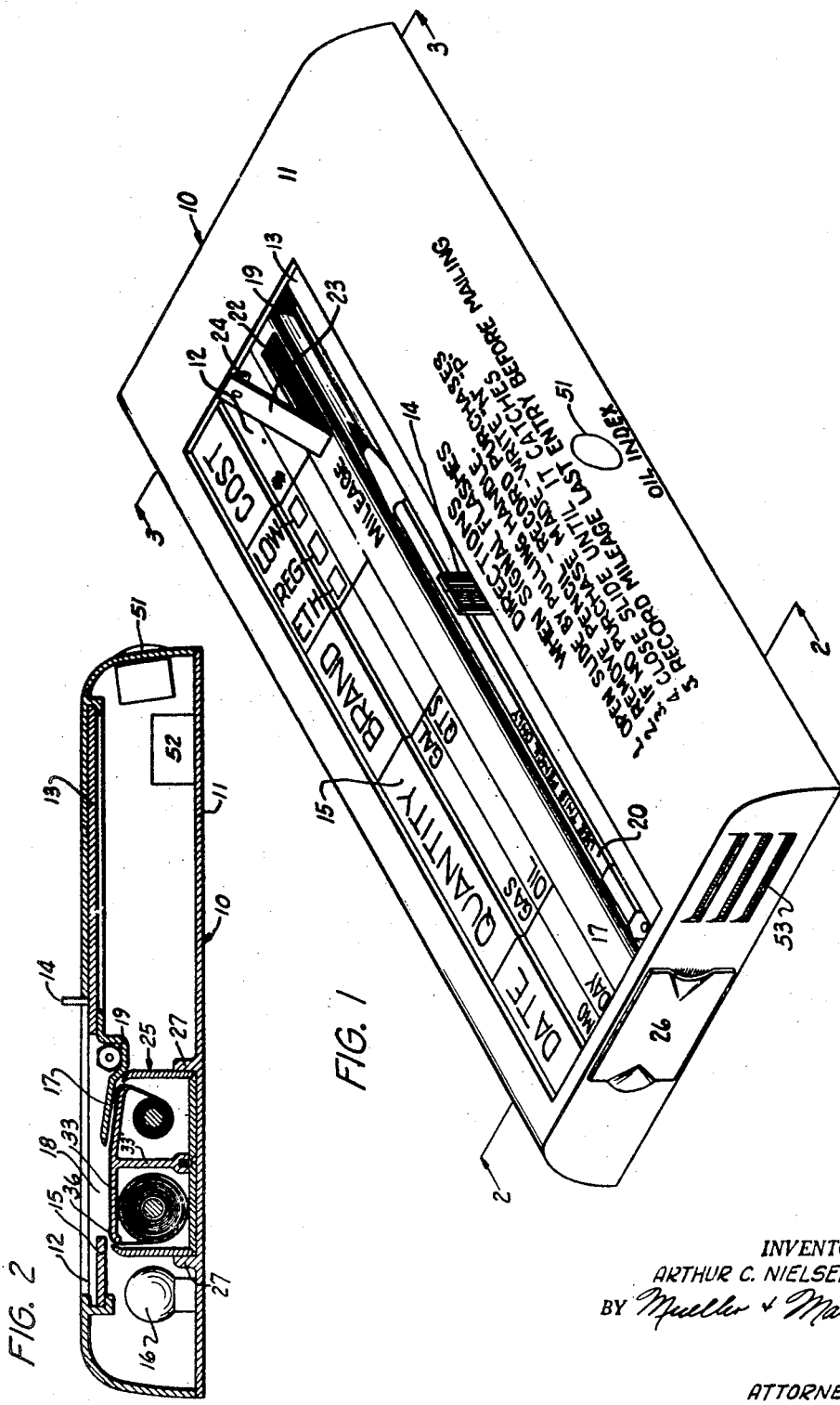
INVENTOR
ARTHUR C. NIELSEN
BY Mueller & Mason
ATTORNEYS March 21, 1950  A. C. NIELSEN  2,501,079
RECORDING APPARATUS
Filed May 1, 1946  3 Sheets-Sheet 2
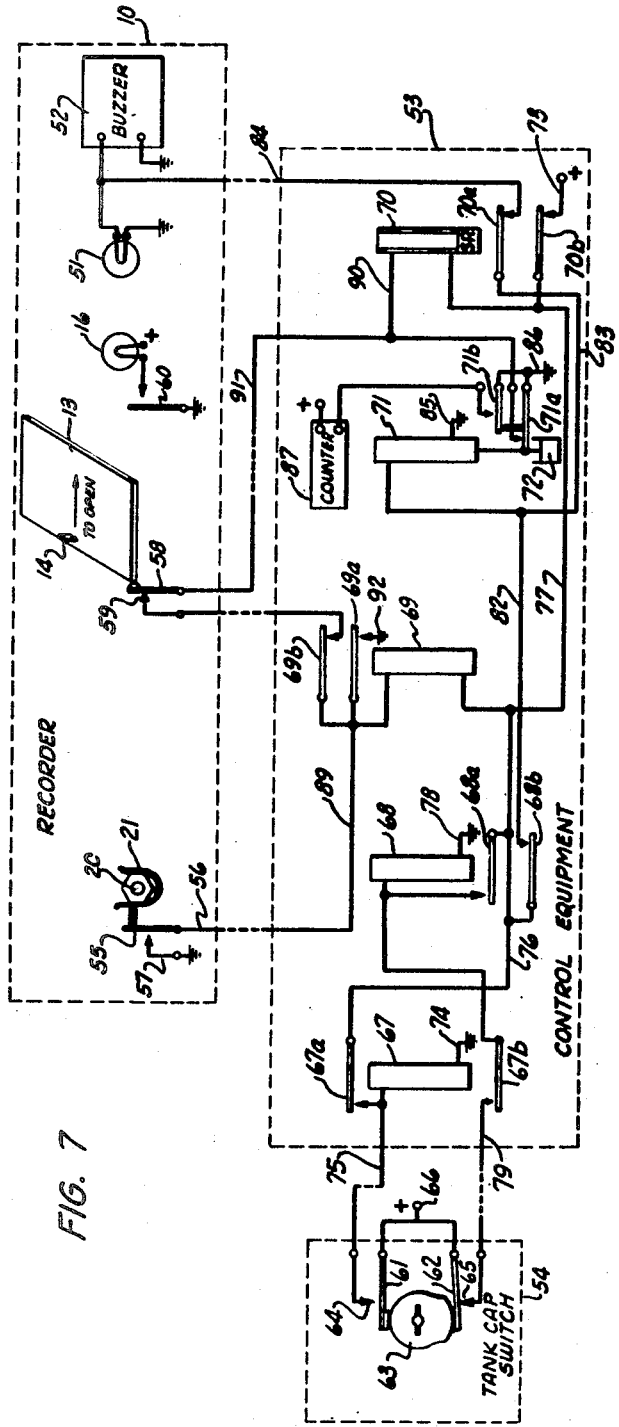
FIG. 7
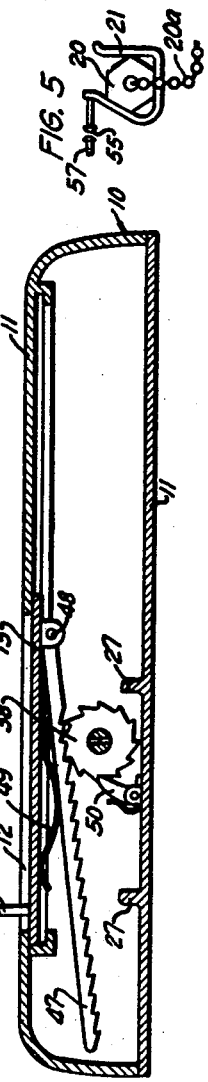
FIG. 5
FIG. 3
INVENTOR
ARTHUR C. NIELSEN
BY *Mueller & Mason*
ATTORNEYS March 21, 1950
A. C. NIELSEN
2,501,079
RECORDING APPARATUS
Filed May 1, 1946
3 Sheets-Sheet 3
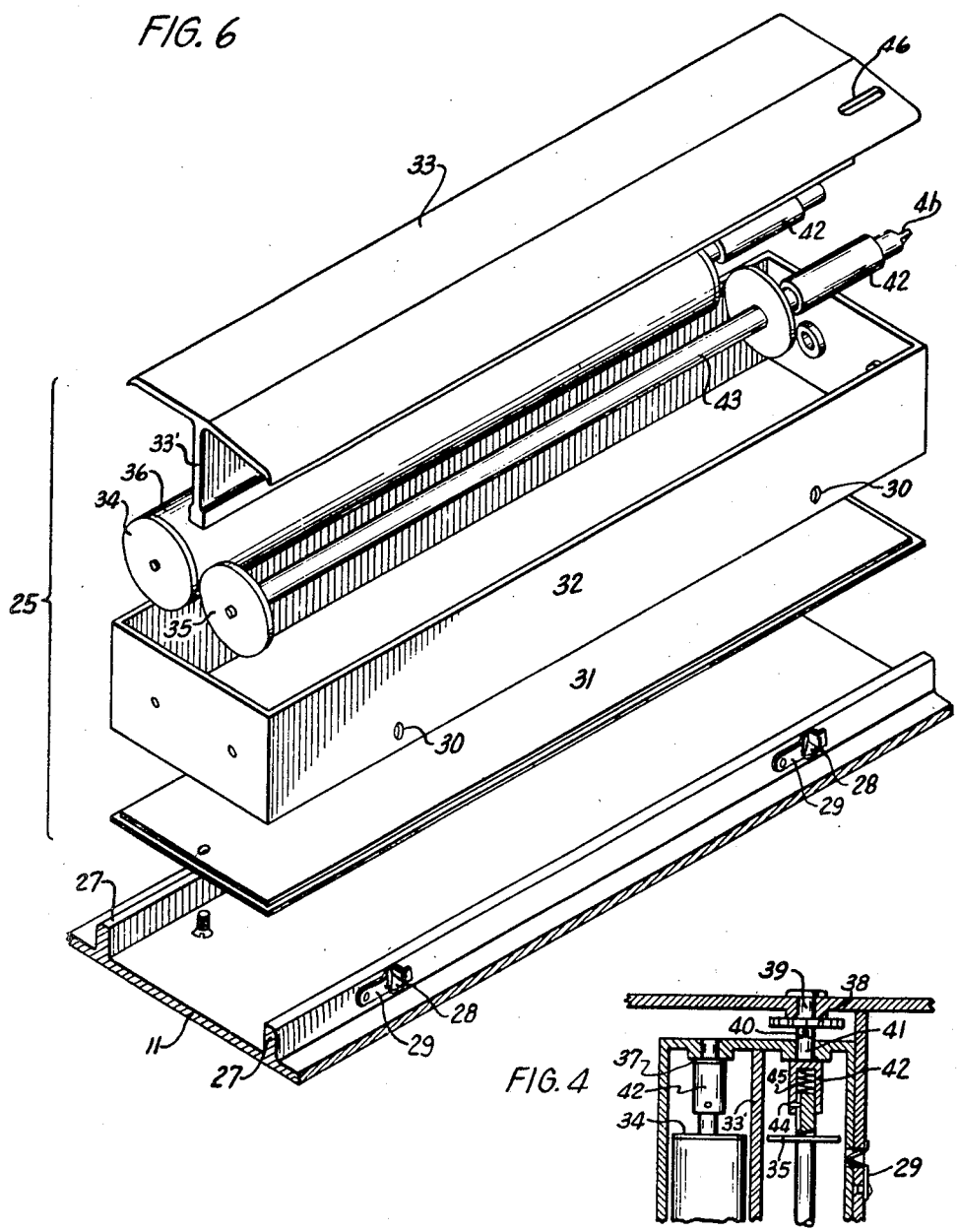
INVENTOR
ARTHUR C. NIELSEN
BY Mueller & Mason
ATTORNEYS Patented Mar. 21, 1950

2,501,079

UNITED STATES PATENT OFFICE 2,501,079

RECORDING APPARATUS

Arthur C. Nielsen, Winnetka, Ill., assignor to A. C. Nielsen Company, Chicago, Ill., a corporation of Illinois Application May 1, 1946, Serial No. 666,261

6 Claims. (Cl. 281—8)

The present invention relates to recording apparatus and more particularly to a statistical analysis apparatus for recording data on the purchases of expendable quantities of material such as oil or gasoline for prime movers such as employed in automotive vehicles or the like.

Modern merchandisers spend huge sums of money in advertising their products. In order that they may know whether such sums of money are well spent it is desirable that they have some satisfactory and accurate means of analyzing the effectiveness of such advertising. This becomes especially important in a highly competitive field such as is the case, for example, with vendors of oil or gasoline who sell their products directly or indirectly to the operators of oil or gas consuming devices such as motor vehicles. It is desirable for such merchandisers to be able to obtain reasonably accurate data relating to oil or gasoline sales in a particular area by sampling a representative group of operators so that a reliable analysis may be made of such data to determine the effectiveness of advertising campaigns carried on in such area for any individual merchandiser. Apparatus for obtaining such data should be simple, inexpensive and foolproof with regard to obtaining accurately the necessary data.

Whenever the operator of a gasoline or oil consuming device such as a motor vehicle, said operator being a part of the statistical sample, purchases oil or gas or both he should be reminded by suitable means that such purchase data should be recorded. Furthermore the recording of such data should cause him a minimum of inconvenience and should be recorded in such a manner that it may at stated intervals be referred to a suitable organization for analysis without causing any substantial additional inconvenience to the operator of the automotive vehicle or like device. Such statistical analysis systems should be constructed so they can readily be installed in apparatus such for example as automotive vehicles of a selected cross-section of automobile operators in a particular area, for example, where an extensive advertising campaign is to be carried out, whereby accurate data may be obtained both before and after such campaign to give an index or measure of the effectiveness of such advertising.

It is an object of the present invention to provide a simple, inexpensive purchase data recording device which will accomplish the results referred to above.

It is another object of the present invention to provide a new and improved statistical analysis apparatus for recording purchase data including a removable portion containing the recorded data which at stated intervals of time can be readily and conveniently sent to an analysis organization.

Another object of the present invention is to provide a new and improved statistical analysis apparatus for automotive vehicles, which is small and compact so that it will not take up an inordinate amount of space in the vehicle and yet provides means for recording all the necessary data and furthermore, substantially insures the proper recording thereof.

It is another object of the present invention to provide a new and improved statistical analysis apparatus for use in market research in which it is impossible for the collaborator to analyze his own purchases.

A further object of the present invention is to provide an improved recording device including a transportable record assembly in which the purchaser is reminded to make a recording before removal of the transportable record assembly is permitted.

Further objects and advantages of the present invention will become apparent as the following description proceeds and the features of novelty which characterize the present invention will be pointed out with particularity in the claims annexed to and forming a part of this specification.

For a better understanding of the present invention reference may be had to the accompanying drawings in which:

Fig. 1 is a perspective view of a recording device embodying the present invention with the recording device shown in position for making a recording;

Fig. 2 is a sectional view taken on line 2—2 of Fig. 1;

Fig. 3 is a sectional view taken on line 3—3 of Fig. 1, except with the cover of the recording device illustrated in the closed position;

Figs. 4 and 5 are partial views illustrating in detail different portions of the recording device of Fig. 1;

Fig. 6 is an exploded perspective view of a transportable record assembly employed in the recording device of Fig. 1, together with an associated portion of the recording device of Fig. 1; and Fig. 7 is a schematic circuit diagram illustrating the electrical control system for the recording device with the cover thereof in the same position as in Fig. 3.

Although the present invention is applicable for use in obtaining data regarding purchases of any expendable material used in operating any apparatus or device, it is particularly adapted for use in obtaining data concerning gasoline or oil purchases for automobiles, and the present invention has been specifically illustrated in connection with such an application. It should be understood, however, that its application is not limited to obtaining such specific purchase data.

Referring now to the drawings, there is illustrated a recording device generally indicated at 10, comprising a somewhat rectangular shaped substantially closed casing or housing 11, preferably of such dimensions that it may readily fit into the glove compartment of an automotive vehicle or into any relatively small space in such a vehicle. The housing 11 is provided at its upper surface with an opening 12 adapted to be closed by a slidable cover 13 which may be manually actuated by means of a suitable handle 14. The cover 13 is shown in the open position in Figs. 1 and 2 of the drawings and in the closed position in Figs. 3 and 7 of the drawings. Part of the opening 12 is preferably closed by a glass or plastic heading panel or plate 15 which is preferably illuminated by means of a suitable source of light 16 mounted within the housing 11. The light from the source 16 will thus be diffused from the edge of the plate 15 so as to illuminate the unclosed portion of the opening 12 which defines the recording space. The plate 15 may have suitable indicia thereon as indicated in Fig. 1 of the drawings, to call the purchaser's attention to pertinent data which should be recorded.

The recording space defined by the opening 12 in the housing 11 and limited by the heading panel 15 is further so restricted by a suitable panel 17 as to define a recording space 18 between the edges of the panels 15 and 17 within the opening 12. Both of the panels 15 and 17 are so positioned that the cover 13 may be moved to open or closed positions without interference. The panel 17 includes a depression or trough 19 for accommodating therein a suitable recording instrument 20 which may be an ordinary writing implement such as a pencil, or may be a steel stylus pencil in the event that recording paper sensitized to a steel stylus is employed. As far as the present invention is concerned, the specific construction of recording implement 20 is immaterial. Preferably this recording implement is attached by suitable means such as a chain 20a shown in Fig. 5 of the drawings, or other suitable means, to the housing 11. The writing implement 20 is so positioned in the depression or trough 19 that it does not interfere with movement of the cover 13. In order to hold the recording implement 20 in position and to perform a controlling function which will be described in detail hereinafter, there is provided a suitable clip 21, best shown in Figs. 6 and 7 of the drawings, which is fastened in the trough or depression 19 of the panel 17.

Preferably, the panel 18 is also provided with a small recording opening 22 closed by a suitable pivotally mounted cover 23. A locking pin 24 is fastened to the free end of the cover 23 and extends into the housing 11 when the cover 23 is closed. The purpose of the locking pin 24 will become apparent as the following description proceeds. Adjacent the opening 22 on the panel 17 suitable indicia such as "Mileage" may be inscribed so that the purchaser of the expendable material will recognize the opening 22 as providing access to a recording space for use in recording the mileage reading at periodic intervals.

In order that the recorded purchase data may be made readily available to a data analysis organization, the recording device 10 is provided with portion thereof in the form of a unitary self-contained transportable record assembly or removable cartridge generally indicated by the reference numeral 25 and best shown in the exploded perspective view of Fig. 6 of the drawings. To accommodate the unitary self-contained record assembly 25, the housing 11 is provided with an opening at one end thereof closed by a suitable cover 26. The base of the housing 11 is provided with inwardly extending guide members 27 shown in Figs. 2, 3, 4 and 6 of the drawings between which the record assembly 25 is slidable when inserted or removed through the opening closed by the cover 26. The guides 27 are preferably provided with openings 28 within which are positioned suitable spring fingers or the like 29 for engaging with cooperating openings 30 in the transportable record assembly so as to removably position the transportable record assembly 25 within the housing 11.

Inasmuch as it is desirable to be able to mail the unitary self-contained transportable record assembly 25 from a collaborator to an analyzing organization in an addressed and stamped container furnished by the analyzing organization, this assembly is constructed to comprise a suitable housing defined by a base 31, a rectangular frame 32 and a platen 33 having a downwardly extending web 33' for supporting the platen 33 in its proper position. Within the housing of the transportable record assembly are provided a supply roll or spool 34 and a take-up and drive roll or spool 35 for a recording tape or record strip 36 which is adapted to move over the platen 33 in the manner clearly shown in Fig 2 of the drawings, whereby recordings may be made on the record strip 36 while positioned on the platen 33. The supply and drive rolls 34 and 35 are rotatably mounted within the rectangular frame 32 of the transportable record assembly 25. If desired, a suitable dished washer 37 may be provided to act as a brake for the supply roll 34. It is obvious that any suitable braking means may be employed for this purpose and it forms no part of the present invention.

For the purpose of rotating the supply and drive rollers 34 and 35, thereby to move the record strip 36, there is provided in the housing 11 a ratchet 38 mounted on a shaft 39 rotatably supported in the end wall of the housing 11 opposite the opening closed by the cover 26 and between the guides 27. The shaft 39 is provided with a slotted end 40 adapted to mate with the keyed end 41 of the shaft which supports the drive roller 35. When the transportable record assembly 25 is inserted in the housing 11 the slotted and keyed ends 40 and 41 of the shaft 39 and the shaft suporting the drive roller 35, respectively, are interlockingly engaged as shown in Fig. 4 of the drawings, whereby movement of the record strip 36 is obtained upon rotation of the ratchet 38.

In order that the spool 35 may easily be removed from the housing 32 and in order to facilitate proper positioning of the assembly 25 in the housing 11, even though the matching keyed ends of the shaft 39 and the shaft supporting the take-up or drive roller 35 are not in proper alignment, there is provided a stub shaft 42 keyed as indicated at 44 for limited axial movement relative to the shaft 43 of the drive or take-up roller 35 as is indicated at 44. The stub shaft 42 is axially movable relative to the shaft 43 and is biased to the position indicated in Fig. 4 of the drawings by suitable spring means 45. With this construction, the spool 35 may upon removal of the platen 33, easily be removed from the housing 32 by manually withdrawing the stub shaft 42 from its bearing in the end wall of the housing 32. It is also quite obvious that when the transportable record assembly 25 is inserted in the housing 11 to the position indicated in Fig. 4 of the drawings with the spring biased fingers 29 interlocking with the openings 30, the stub shaft 42 may be moved in an axial direction relative to the shaft 43 in the event that the matching keyed ends of the stub shaft 42 and the shaft 39 are not in alignment. As soon as the ratchet 38 is rotated to align the keyed ends of these shafts then spring 45 will cause stub shaft 42 to assume the position indicated in Fig. 4 of the drawings. It will be obvious that the described arrangement also makes for ready insertion of the shaft 43 into its bearings in the record assembly. To permit removal and replacement of the supply roll 34, the shaft of this supply roll is also preferably constructed in the manner described above to include a spring biased stub shaft 42.

To remind the purchaser of the expendable material upon which purchase data is being obtained to make a mileage recording prior to removal of the transportable record assembly 25 and mailing thereof to the analysis organization for compilation of the data and analysis thereof, this assembly or removable cartridge 25 is provided with a suitable aperture 46 in platen 33 which cooperates with the locking pin 24 associated with the cover 23 referred to above. When the cover 23 is in the closed position covering the opening of the mileage recording portion of the device, the locking pin 24 is inserted in the aperture 46 and the transportable record assembly or removable cartridge 25 is locked in position such that it cannot be removed without first opening the cover 23.

As clearly shown in Fig. 1 of the drawings, the movable recording tape or record strip 36 is preferably provided with suitable signs or markings to aid the purchaser in recording the proper data. These markings are preferably related to the indicia provided on the translucent or transparent panel 15. Suitable means should be provided for advancing the movable record strip 36 following each recording operation and to this end, the ratchet 38 is arranged for actuation in response to opening of the cover 13 of the recording device 10. Specifically and as is best shown in Fig. 3 of the drawings, the cover 13 is provided with a rack 47 pivotally mounted upon the door 13 by suitable axis means 48. A bowed leaf spring 49 biases the rack 47 into engagement with the ratchet 38. Also, a suitable spring biased pawl 50 is mounted within the housing 11 to engage the teeth of the ratchet 38 so as to prevent rotation in any but the proper direction, which is clockwise as viewed in Fig. 3 of the drawings. Each time the door 13 is moved to the open position, the rack 47 which is biased into engagement with the ratchet 38 by means of the spring 49, is moved to the right as viewed in Fig. 3, to produce resultant rotation of the ratchet 38 and movement of the record strip 36 across the platen 33. The ratchet 38 and the rack 47 are so designed and the sets of markings on the strip 36 are so spaced that the successive sets of markings appearing on the record strip will always assume the same position relative to the recording space 18 of the housing 11 in response to successive operations of the cover 13 between its closed and open positions. If there is to be a large variation in the diameter of the take-up spool as more and more of the record strip is wound thereon whereby movement of rack 47 causes an increased increment of paper movement, it may be desirable to vary the spacing between the successive sets of markings appearing on the record strip, thereby insuring that these sets of markings are successively in registry with the recording space 18.

In order for a recording device of the type described above to be effective in providing the necessary purchase data, it is desirable that the purchaser be reminded to make the necessary recordings when purchases of expendable materials such as gasoline are made. Accordingly there is provided an annoyance signal which is preferably both visible and audible and which, as will become apparent as the following description proceeds, is rendered effective to urge the purchaser to make the necessary recordings to terminate the annoyance signal. If desired, such annoyance signal may be mounted separately from the housing 11 in any suitable visible place in the vehicle. This is particularly desirable when the recording device 10 is placed in the glove compartment of the automobile, for example. In the event that the recording device 10 is positioned in a visible place in the automobile the signalling means may be, as illustrated in the drawings, built into the recording device 10. Specifically, a visual signal 51 is provided which is located at any suitable place so as to be visible outside of the housing 11. Associated with the visual signal 51 there is preferably also provided an audible signal such as a buzzer 52 mounted within the housing 11. When the audible signal 52 is mounted within the housing 11 a suitable grill 53 should be provided in the housing 11 to permit the sound to be readily transmitted outside the housing.

In order to insure that the purchase data is recorded by the purchaser there is provided a suitable control circuit and equipment which is associated with the recording device 10 as disclosed in Fig. 7 of the drawings. The essential parts of the recording device 10 described above which functionally coact with the control equipment are schematically shown in Fig. 7 of the drawings and characterized by the same reference numerals as in the preceding figures. As was mentioned above, the present invention is specifically illustrated in connection with a recording device for recording gasoline purchases, although it is equally adaptable for use in recording purchases of other expendable materials.

Referring now to Fig. 7 of the drawings, there is illustrated the present improved statistical analysis system which essentially comprises three parts, i. e., the recording device 10, a relay unit or control equipment 53 which may be positioned at any suitable place within the associated apparatus or device such as an automobile, and a control switch unit 54 associated with the gas tank cap or the oil aperture of the automobile or other device.

The recording device 10 per se has been fully described above except for the electrical control circuits associated therewith. The spring clip 21 for holding the recording implement 20 in position is constructed in the manner shown in Fig. 5 of the drawings so that upon removal of the recording implement 20, the spring clip 21 is distorted to operate a normally open switch or contact member 55 into engagement with a grounded contact 57.

When the cover 13 of the recording device 10 is in the closed position shown in Fig. 7 of the drawings it operates a switch member 58 which is so moved as to be in electrical engagement with a contact 59. On the other hand, when the door 13 is moved to the open position it actuates a switch member 60 to connect the lamp 16 across a source of potential such as the battery of the automobile, thereby illuminating the transluscent or transparent panel 15 and consequently the recording space 18 of the recording device 10.

The visible signal 51 and the audible signal 52 are connected in parallel with each other, with one terminal of each grounded as is clearly indicated in Fig. 7 of the drawings.

The control unit 54 specifically illustrated as applied to a gas tank cap but equally applicable to an oil tank cap or other container for expendable materials, comprises a pair of switches 61 and 62, respectively, controlled by a suitable cam member 63 associated with the gas tank cap. Removal of the gas tank cap necessitates clockwise rotation of the cam 63 as viewed in Fig. 7 of the drawings to actuate the switch 61 to the closed position in engagement with the contact 64. Replacement of the gas tank cap, on the other hand, causes rotation of the cam 63 in a counter-clockwise direction with the result that the switch 62 engages the contact 65. The switches 61 and 62 are illustrated as being connected to a suitable source of battery potential, the positive terminal being indicated at 66 and the negative terminal being grounded.

The relay unit 53 comprises a plurality of circuit conditioning relays 67, 68 and 69, a slow release resetting relay 70 and a time delay relay 71. The relay 67 controls a normally open seal-in or lock-in contact 67a and a normally open contact 67b. The relay 68 controls a pair of normally open contacts 68a and 68b, respectively. The relay 69 also controls a pair of normally open contacts 69a and 69b, respectively. The slow release resetting relay 70 controls a pair of normally closed contacts 70a and 70b, while the time delay relay 71 controls a pair of normally open contacts 71a and 71b, respectively. Preferably the relays 67, 68 and 69 are instantaneous relays both when energized and deenergized with reference to operation of their respective contacts. The relay 71 is illustrated as a dash pot relay as evidenced by the dash pot 72, and when energized, closes its normally open contacts 71a and 71b only after a predetermined time delay. Upon deenergization, however, the relay 71 substantially instantaneously releases to open its contacts 71a and 71b. The relay 70 is preferably of the type which, when energized, instantaneously opens its normally closed contacts 70a and 70b but when deenergized, closes these contacts after a short time delay relative to the instantaneous release type relays 67, 68, 69 and 71. By means of its normally closed contact 70b, the relay 70 controls the potential supplied to the relays 67, 68, 69 and 71. As illustrated, the positive terminal of the supply source indicated at 73 is connected directly to the cooperating contact associated with the relay contact 70b.

To consider the operation of the system, when the gas tank cap is removed preparatory to replenishing the gas supply for the automobile, the cam 63 is rotated in a clockwise direction as viewed in Fig. 7 of the drawings so as to move switch 61 to the closed position, after first opening the switch 62, thereby connecting the positive battery terminal 66 to ground as indicated at 74 through the switch 61, the cooperating contact 64, the conductor 75 and the winding of relay 67. Thus the relay 67 is energized to effect movement of the contacts 67a and 67b to the closed position. At the contact 67a, a seal-in or lock-in circuit is completed for the relay 67, this circuit extending from the ground terminal 74 through the switch 67a, the conductor 76, the conductor 77, and the contact 70b of the relay 70 to the positive battery terminal 73. By virtue of the closing of contact 67b, the control circuit is preconditioned for the subsequent control operation resulting upon replacing the gas tank cap. When this occurs, the cam 63 is rotated in a counter-clockwise direction to the position indicated in Fig. 7 so that the switch 62 engages the contact 65 to energize the relay 68 which extends from the ground terminal through the switch contact 67b, the conductor 79 and the switch 62 to the positive battery terminal 66. Upon operating, the relay 68 is sealed in through the seal-in contact 68a and serially arranged contact 70b of the relay 70.

At its contact 68b, the relay 68 energizes the visual and audible signal means 51 and 52, respectively, in a circuit which includes the normally closed contact 70b of the relay 70, the conductor 77, a part of the conductor 76, the normally open contact 68b of the relay 68, the conductor 82, the conductor 83, the normally closed contact 70a of the relay 70 and the conductor 84. The timing relay 71 is connected in parallel with the signal means 51 and 52 to a ground connection 85 so that energization of the relay 68 following energization of the relay 67 also causes the relay 71 to be energized. The dash pot 72, however, preferably provides a time delay of the order of five minutes so that contacts 71a and 71b are not closed until the elapse of this time delay period.

The annoyance signal produced by the described energization of the signal means 51 and 52 should cause the operator to make the necessary recordings in recording device 10 with the resultant termination of the signalling operation. The time delay relay 71 is provided primarily to terminate operation of the signalling means after a delay of the order of five minutes or the like in the event that the signalling means is not terminated in the normal manner to be described hereinafter. This will prevent an undue drain on the battery of the automotive vehicle. In the event operation of the annoyance signal means comprising the visual signal 51 and the audible signal 52 is not terminated after an operation of the order of five minutes or the like, the dash pot 72 permits the relay 71 to close its normally open contacts 71a and 71b. Closing of the contact 71a connects the slow-release relay 70 through its own normally closed contact 70b and the contact 71a of the time delay relay 71 across the battery terminals indicated as 73 and 86, respectively, whereupon the relay 70 is immediately energized to open its contacts 70a and 70b terminating the operation of the signal means and causing immediate release of the relays 67, 68, 69 and 71 by virtue of the opening of the normally closed contact 70b. It is desirable for the analysis organization to know that the annoyance signal means was terminated by a failure on the part of the purchaser to make the necessary recording and to this end a suitable counting device generally indicated at 87 may be provided which is energized to perform a counting operation upon each closure of the normally open contact 71b of the time delay relay 71. Preferably, this device is incorporated in the assembly 25.

It is anticipated that in substantially all cases the annoyance signal means, when energized, shall be terminated by the purchaser making the appropriate entries on the recording device 10. Assuming now that the annoyance signal means are energized, the purchaser will recognize that a recording should be made and will open the door 13 of the recording device 10, thereby advancing the recording tape 36 and closing the switch 60 to energize the lamp 16 and thus illuminate the recording space. The next step in the recording operation is removal of the writing implement 20 from its position in the depression 19 where it is held by the spring clip 21. By virtue of the construction of the spring clip 21, removal of the recording implement 20 causes the switch 55 to engage its associated contact 57, whereupon the relay 69 is energized, the battery terminal 73 being connected through the normally closed contact 70b of the relay 70, the conductor 77, the winding of the relay 69, the conductor 89, and the switch 55 to the grounded battery terminal 57. Upon energization of the relay 69 its normally open contacts 69a and 69b are closed. The contact 69a is a seal-in or lock-in contact and maintains energization of the relay 69 even after the writing implement 20 is fully removed and the switch 55 is opened. In the normal course of events, the purchaser makes the desired inscriptions on the record strip 36 and replaces the writing implement 20. All during this time the annoyance signal means continues in operation. Upon replacing the writing implement 20 in its position in the depression 19, the door 13 may be closed and when it reaches its fully closed position the switch 58 is moved to engage its associated contact 59, thereby to energize the slow-release relay 70. The circuit for energizing the slow-release relay 70 may be traced from the positive battery terminal 73 through the contact 70b, the winding of the slow-release relay 70, the conductors 90 and 91, the switch 58, the contacts 69b and 69a to the grounded battery terminal 92. Energization of the slow-release relay 70 causes immediate opening of the contacts 70a and 70b with the resultant deenergization of the relays 67, 68, 69 and 71 as well as deenergization of the annoyance signal means comprising the visible signal 51 and the audible signal 52.

In view of the detailed description included above the operation of the statistical analysis apparatus and system will be fully apparent to those skilled in the art and no further discussion thereof will be included herein. It will be evident, however, that a recording device is provided in which the desired data may be recorded, and by virtue of the described operation of the annoyance signal means will be recorded. At the end of a predetermined period the purchaser will mail the self-contained transportable record assembly 25 to the analyzing organization in the mailing means provided therefor. By virtue of the interlock between the cover 23 and the transportable device 25, removal thereof is prevented until the cover 23 is opened, thereby further urging the purchaser to make a mileage entry.

From a marketing research standpoint, an important feature of the recording apparatus described above is that it is impossible for the collaborator to analyze his own prior purchases since they are not available to him by virtue of the fact that the recorded matter moves out of sight after each recording operation. A collaborator should not from the standpoint of sound marketing research be influenced by records of his prior purchases, nor should others such as members of the collaborator's family be able to examine prior purchase data and be influenced thereby.

While a particular embodiment of the present invention has been disclosed it is not desired that the invention be limited to the construction shown and described for it will, of course, be obvious that changes and modifications may be made therein without departing from the invention and it is aimed in the appended claims to cover all such changes and modification as fall within the true spirit and scope of the invention.

I claim:

1. A recording apparatus for recording gasoline purchases for an automotive vehicle comprising a housing having a recording aperture, a unitary self-contained transportable record assembly removably disposed within said housing for containing a continuous record strip having a data-recording portion registering with said aperture when in position in said housing, means for moving said record strip relative to said aperture, and means including a transparent panel adjacent said aperture and a light below it for illuminating the portion of said record strip in registry with said aperture in response to operation of said last mentioned means.

2. In a recording apparatus comprising, a housing having a recording aperture, a unitary self-contained transportable record assembly comprising a container removably disposed within said housing for supporting a continuous record strip movable past a data-recording portion of said container registering with said aperture when in position in said housing so that recordings can be made on said strip through said aperture, means in said container for movably supporting said record strip, a ratchet mounted in said housing and removably engageable with said last mentioned means, a movable cover for said recording aperture, and a rack pivotally mounted to said cover for engaging said ratchet to move said record strip relative to said aperture in response to movement of said cover.

3. A recording apparatus comprising a housing having a recording aperture, a unitary self-contained transportable record assembly including a container removably disposed within said housing for supporting a continuous record strip for movement past a data-recording portion of said container, said data recording portion registering with said aperture when said container is in position in said housing, a second recording aperture in said housing adjacent said first recording aperture, a cover for said second aperture and means interengaging said cover and said container so that said container cannot be removed from said housing without first opening said cover.

4. A recording apparatus comprising a housing, having a recording aperture, a unitary self-contained transportable record assembly including a container removably disposed within said housing for supporting therein a record strip movable past said aperture when said container is in position in said housing, a movable cover openable to give access to said record strip through said aperture, and interlock means for preventing removal of said container from said housing until said cover has been opened.

5. A recording apparatus comprising a housing having a recording aperture, a unitary self-contained transportable record assembly including a container slidably disposed within said housing, a pair of guide members in said housing extending substantially the full width of the container and between which said container is slidable, means for supporting a record strip in said container for movement past a data-recording portion of said container, and latching means on one of said guide members engageable with said container for removably positioning said container in said housing so that said data recording portion is in registry with said aperture.

6. A statistical analysis apparatus comprising a housing having a recording aperture, a unitary self-contained transportable record assembly in the form of a mailable magazine removably associated with said housing and including means for supporting therein a continuous record strip, said last mentioned means being capable of supporting said strip so that a data-recording portion thereof registers with said aperture when supported by said last mentioned means, and disengageable record driving means including a driving element mounted in said housing and a driven element mounted on said removable assembly and disengageably associated with said driving element for moving said record strip relative to said aperture.

ARTHUR C. NIELSEN.

REFERENCES CITED

The following references are of record in the file of this patent:

UNITED STATES PATENTS

| Number | Name | Date |
|---|---|---|
| 511,854 | Leonard | Jan. 2, 1894 |
| 1,494,294 | Sheridan et al. | May 13, 1924 |
| 1,729,480 | Hale | Sept. 24, 1929 |
| 2,167,893 | Kinney | Aug. 1, 1939 |

FOREIGN PATENTS

| Number | Country | Date |
|---|---|---|
| 3,793 | Great Britain | Feb. 15, 1912 |
| 8,524 | Great Britain | Apr. 12, 1907 |
| 447,021 | Great Britain | May 11, 1936 |